US007865400B2

(12) United States Patent
Rogers et al.

(10) Patent No.: US 7,865,400 B2
(45) Date of Patent: Jan. 4, 2011

(54) APPARATUS AND METHODS FOR COMMUNITY BASED PURCHASING BY MOBILE BUYERS

(75) Inventors: Sean Scott Rogers, San Diego, CA (US); Brian Minear, San Diego, CA (US); Richard Wayne Gardner, III, Rancho Santa Fe, CA (US); Stephen A. Sprigg, Poway, CA (US)

(73) Assignee: Qualcomm Incorporated, San Diego, CA (US)

( * ) Notice: Subject to any disclaimer, the term of this patent is extended or adjusted under 35 U.S.C. 154(b) by 949 days.

(21) Appl. No.: 11/361,222

(22) Filed: Feb. 23, 2006

(65) Prior Publication Data

US 2007/0198360 A1 Aug. 23, 2007

(51) Int. Cl.
*G06Q 30/00* (2006.01)
(52) U.S. Cl. .......................................... 705/26; 705/27
(58) Field of Classification Search .................... 705/26, 705/27
See application file for complete search history.

(56) References Cited

U.S. PATENT DOCUMENTS

| | | | | |
|---|---|---|---|---|
| 6,269,343 B1 * | 7/2001 | Pallakoff | ..................... | 705/26 |
| 6,980,964 B1 * | 12/2005 | Cocotis et al. | ................ | 705/26 |
| 2002/0069079 A1 * | 6/2002 | Vega | .............................. | 705/1 |
| 2003/0167204 A1 * | 9/2003 | Makipaa | ....................... | 705/14 |
| 2006/0080238 A1 * | 4/2006 | Nielsen et al. | ................ | 705/40 |

OTHER PUBLICATIONS

Beckett, Jamie; "Personal Technology . . . escrow services in deman as net auctions proliferate," San Francisco Chronicle, Jan. 14, 1999, Proquest #38035765, 5pgs.*

* cited by examiner

*Primary Examiner*—Robert M. Pond
(74) *Attorney, Agent, or Firm*—Christopher S. Chow; Fariba Yadegar-Bandari

(57) ABSTRACT

Community based purchasing methods and apparatus for products/services may include accumulating micro payments from a plurality of mobile buyers equipped with wireless communication devices. A seller, upon notification of accumulation of a predetermined total of micro payments, may then deliver the product/service. Payment by a mobile user may be escrowed upon receipt of the micro payment and be released to the seller upon delivery of the product/service. Product/services purchased using community based purchasing methods and apparatus may include digital content streamed to a buyer's wireless communication device and live performances viewed directly by the buyer.

43 Claims, 5 Drawing Sheets

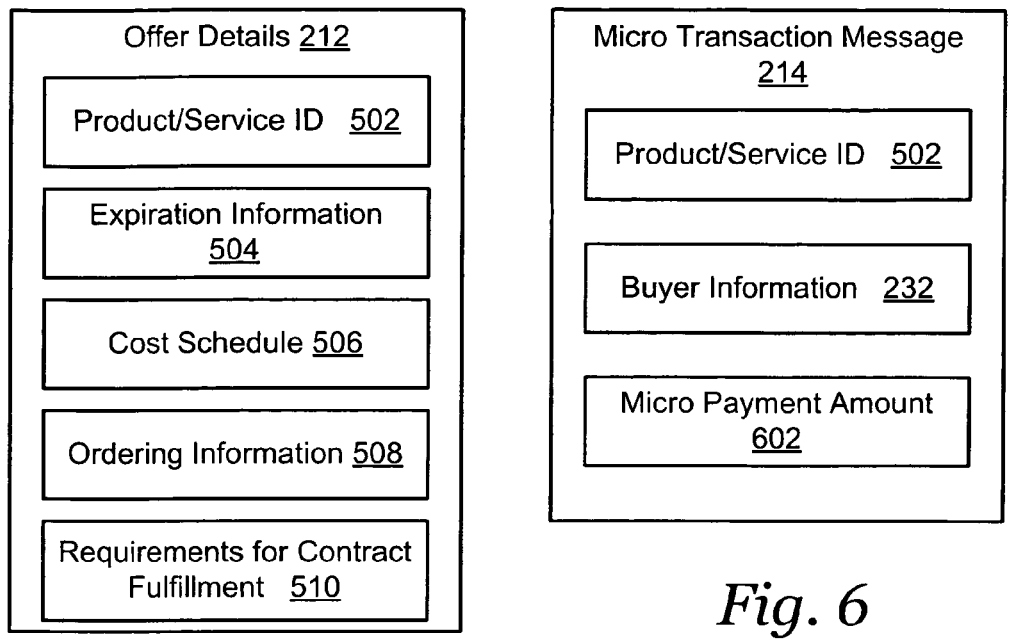
Fig. 5
Fig. 6
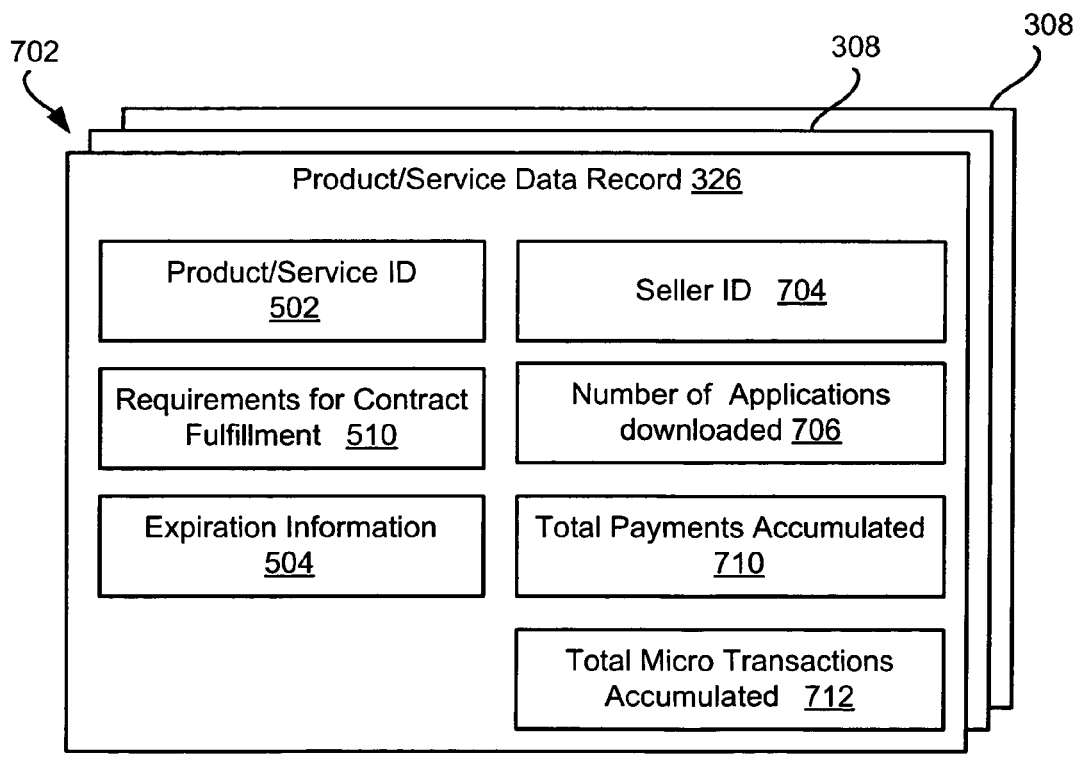
Fig. 7

APPARATUS AND METHODS FOR COMMUNITY BASED PURCHASING BY MOBILE BUYERS

FIELD OF THE INVENTION

The described embodiments generally relate to wireless communications devices and computer networks. More particularly, the present disclosure relates to apparatus and methods for managing purchases between a group of mobile buyers on a wireless network and a seller.

BACKGROUND

Due to the ever-increasing number of people with mobile access to communication networks, mobile buyers, using wireless communication devices, present sellers with a large and relatively technically sophisticated buying community.

Wireless communication devices communicate packets including voice and data over a wireless network. Wireless devices are being manufactured with increased computing capabilities and are becoming tantamount to personal computers. These "smart" wireless devices, such as cellular telephones, have application programming interfaces ("APIs") installed onto their local computer platform that allow software developers to create software applications that operate on the cellular telephone. The API sits between the wireless device system software and the software application, making the cellular telephone functionality available to the application without requiring the software developer to have the specific cellular telephone system source code.

Although the purchasing of product or services by mobile buyers using their wireless communication devices is fairly common, the various purchasing schemes currently offered are relatively simplistic and may not allow the buyer and seller many options. In many instances, the product or service is simply downloaded upon demand to the buyer's device, and the transaction, including debiting the buyer and crediting the seller is managed by the carrier. In such circumstances, where the seller has already made a substantial outlay of capital, either to purchase product or to secure transmission bandwidth or facilities, the seller may be at risk if a certain threshold of sales is not met.

In other purchasing schemes, such as subscription services, a buyer may be required to buy a subscription in advance to finance the delivery of a product or service at a set time in the future. However, due to scheduling uncertainties, many buyers are reluctant to pay in advance for a product or service for which they may unable to take delivery.

Thus, improved mobile purchasing systems are desired.

SUMMARY

The disclosed embodiments provide apparatus and methods for managing purchases of content and services by mobile users using wireless communication devices on a wireless network.

Through the collective purchasing power of a large buyer community, the overall contribution of the community may pay for a product or service that no individual on their own can likely afford. For instance, the presentation of an event, such as a sports event, movie, musical, or play which would otherwise be uneconomical from both the standpoint of the seller and a single buyer, may be possible by offering the product or service to a large buying community, each buyer paying, via a micro transaction, a small portion of the overall cost and the seller fulfilling their portion of the transaction provided that a minimum response is generated.

In one embodiment, a method of purchasing between mobile buyers and sellers, comprises receiving a micro transaction message from a buyer's wireless communication device. The micro transaction message may comprise buyer information, a product or service identifier, and a micro payment amount, the micro payment amount being a portion of a total predetermined requirement, delivery of the product or service pending receipt of the total predetermined amount.

The method may further include accumulating the micro payment amount from one buyer with at least another micro payment amount, and may further include generating purchase status messages to both the seller and the buyer. For example, in one embodiment, a contract fulfillment message may be generated and transmitted to the seller indicating that the accumulated payments meets or exceeds the total seller requirements for the purchase of the product/service.

In another embodiment, a computer-readable medium embodying logic for mobile purchasing by a group of buyers and a seller may comprise at least one sequence of instructions, wherein execution of the instructions by a community purchasing processor may cause the processor to perform the act of receiving a micro transaction message from a buyer's wireless communication device, wherein the micro transaction message may include buyer information, a product/service identifier, and a micro payment amount.

In yet another embodiment, a computer server for managing transactions between a mobile buyer and a seller comprises a communications module to receive a micro transaction message from a buyer's wireless communication device, the micro transaction message comprising buyer information, a product or service identifier, and a micro payment amount, the micro payment amount being a portion of a predetermined total requirement to be received prior to delivery of the product or service. The server may include a micro transaction processing module operable to accumulate the micro payment amount with at least one other micro payment amount and to generate purchase status messages transmittable to the buyer and seller.

In another embodiment, a method of purchasing product or services by a mobile buyer comprises receiving product/service information on a buyer's wireless communication device from a source over a mobile portal across a wireless network. The product or service information may comprise an identification of the product/service, a per buyer cost, and a predetermined total requirement required prior to delivering the product or service. The method further includes generating and transmitting a micro transaction message from the buyer's wireless communication device to a destination, wherein the micro transaction message may include buyer information and a micro payment amount, and a portion of the received product/service information.

In yet another embodiment, a computer-readable data signal may be embodied in a carrier wave embodying logic for mobile purchasing by a group of buyers and sellers. The logic may comprise at least one sequence of instructions, wherein execution of the instructions by processor in a wireless communication device may cause the processor to perform the act of receiving product or service information on a buyer's wireless communication device from a source over a mobile portal across a wireless network. The product or service information may include an identification of the product or service, a predetermined total requirement required prior to delivering the product or service, and a per buyer cost, the per buyer cost being a portion of a total predetermined requirement. The embodying logic may further include transmitting a micro transaction message from the buyer's wireless communication device to a destination, wherein the micro transaction message may include buyer information, a micro payment amount, and a portion of the received product or service information.

In still another embodiment, a wireless communications device may comprise a computer platform further comprising a memory including a buyer client application software module downloaded to the memory across a wireless network from a source, and a runtime environment operable to control the execution of the buyer client application module. The buyer client application module may include an identification of the product or service, a per buyer cost, and a predetermined total requirement required prior to delivering the product or service. The buyer client application module may be operable to generate and transmit a micro transaction message to a destination, wherein the micro transaction message may include buyer information, a micro payment amount, and a portion of the received product/service information.

BRIEF DESCRIPTION OF THE DRAWINGS

Various exemplary embodiments are described in detail, with reference to the following figures, wherein:

FIG. 5 is one embodiment of a data structure of product/service details transmitted to the mobile buyer by the system of FIG. 1.

FIG. 6 is one embodiment of a micro transaction data structure generated by the system of FIG. 1.

FIG. 7 is one embodiment of a data record generated by a community purchasing server of the system of FIG. 1.

DETAILED DESCRIPTION OF EMBODIMENTS

Due to the ever-increasing number of people with mobile access to communication networks, mobile buyers equipped with wireless devices provide sellers with an ever expanding buying community with the technological means of transacting near-real time transactions.

The following detailed description of exemplary embodiments is particularly directed to apparatus, methods and computer readable media that provide for community based purchasing over a wireless network. Mobile buyers may partake in community based purchasing of products/services that without the purchasing power of the community, a single buyer would most likely be unable to purchase. Each purchase may be considered a micro transaction, wherein a plurality of similar micro transactions, generated from other mobile buyers, may be accumulated by the system.

Such apparatus and methods may notify the seller when a predetermined total of micro payments is accumulated, confirming to the seller that there is sufficient funds to proceed with product/service delivery. Such apparatus and methods may also provide buyers with an alternative to subscription services, wherein a mobile buyer may order a product or service on an ad hoc basis and the transaction completed if a predetermined number of micro transactions by like-minded buyers is accumulated.

Figure 1:
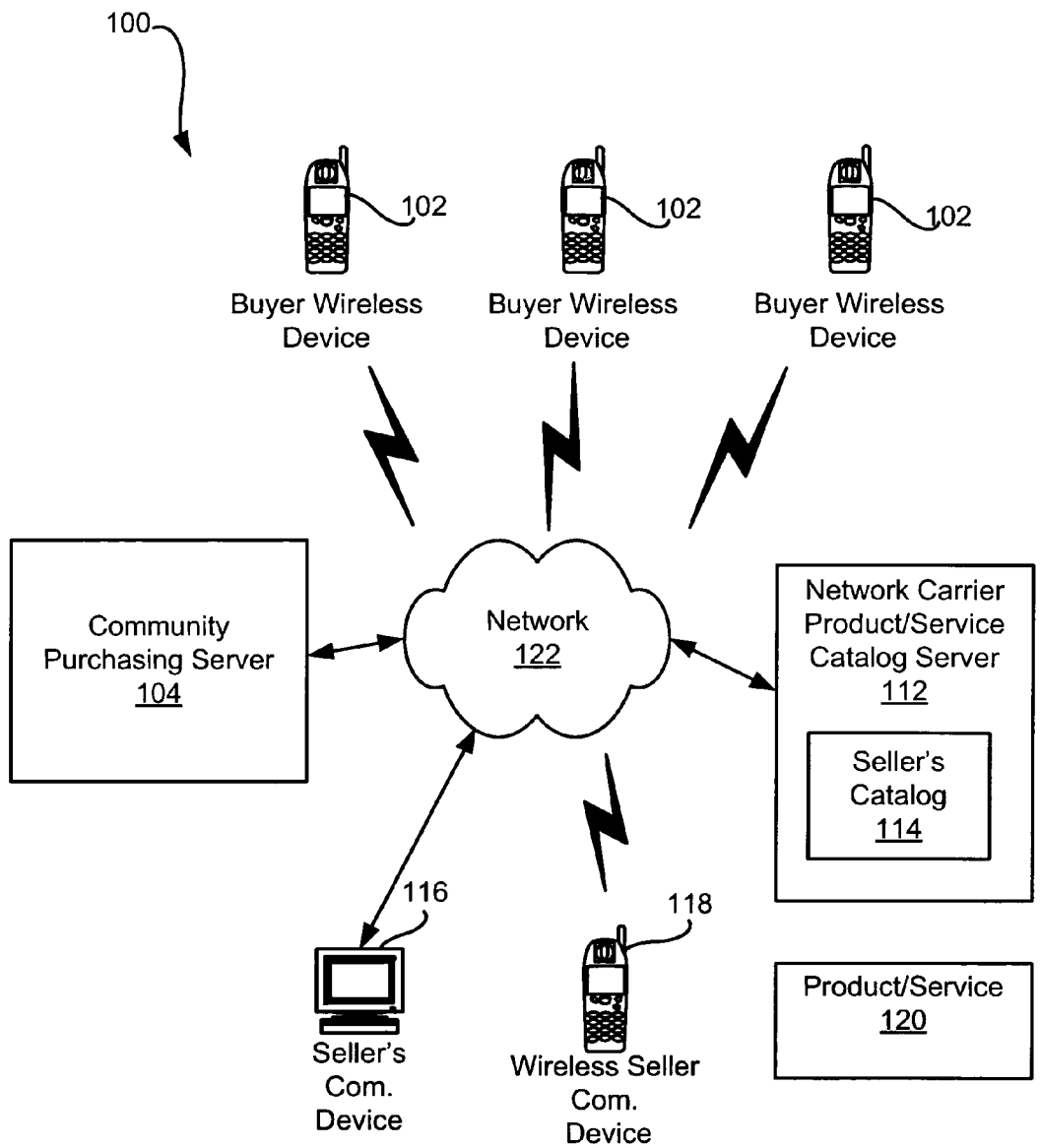
FIG. 1 is a block diagram of one embodiment of a system for managing community based purchasing.

Referring to FIG. 1, one embodiment of a system 100 for community based purchasing of a product/service 120 may include at least one mobile buyer operating a wireless communications device 102, a telecommunications network 122, a community purchasing server 104, a seller operating a communication device 116, 118.

A catalog 114 advertising a seller's product/service 120 may further be viewable by the mobile buyer. In one non-limiting embodiment, the catalog 114 may be hosted on a network carrier product/service catalog server 112.

Wireless devices communicate packets including voice and data over a wireless carrier network and are being manufactured with increased computing capabilities tantamount to personal computers. These "smart" wireless devices, such as cellular telephones, have application programming interfaces ("APIs") installed onto their local computer platform that allow software developers to create software applications that may be downloaded to and operate on the cellular telephone. The API sits between the wireless device system software and the software application, making the cellular telephone functionality available to the application without requiring the software developer to have the specific cellular telephone system source code.

Figure 2:
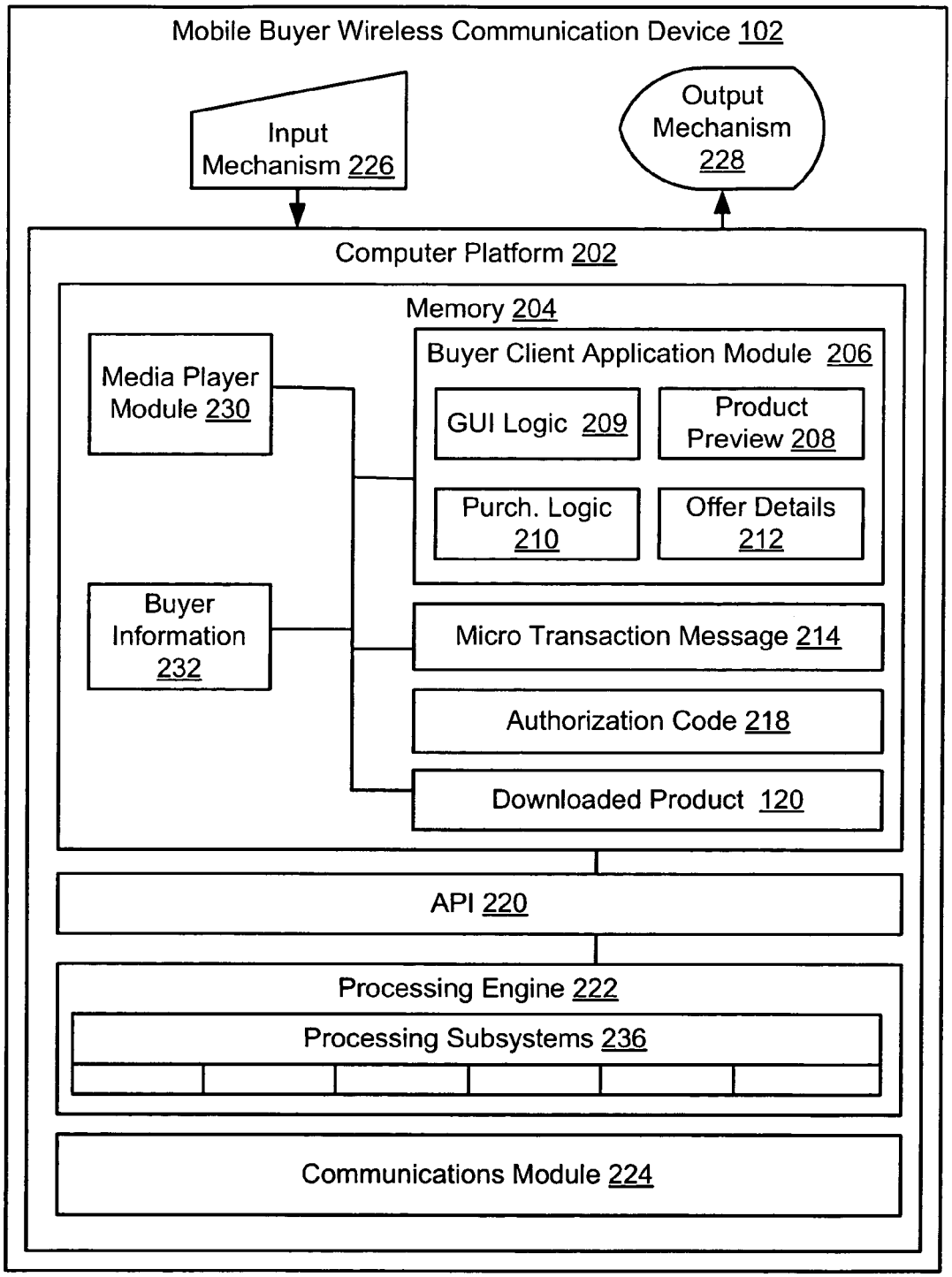
FIG. 2 is a schematic architectural diagram of one embodiment of a mobile buyer wireless communication device of the system of FIG. 1.

Referring to FIGS. 1 and 2, in one embodiment, mobile buyer's wireless communications device 102 comprises a "smart" cellular telephone having a computer platform 202 including a memory 204 for storing data and executable instructions, a processing engine 222 for executing instructions and processing data, and an application program interface ("API") 220 that provides interaction with processing engine 222. Non-limiting, wireless device 102 may include a personal digital assistant, a two-way text pager, a portable computer, and any mobile computer platform that has a wireless communications portal.

The wireless communications device 102 may also include an input mechanism 226 for receiving user inputs and output mechanism 228 for transmitting information to the mobile user. Input mechanism 226 may include, but is not limited to, one or more of an alphabetic and/or numeric keypad, a navigational key, a predetermined function key, a mouse, a touch sensitive display, and voice recognition software. Output mechanism 228 may include, but is not limited to, one or more of a display, an audio speaker, a haptic interface such as a vibrating member, and a light emitting mechanism.

Memory 204 may include read-only and/or random-access memory (RAM and ROM), EPROM, EEPROM, flash cards, or any memory common to computer platforms. Additionally, memory 204 may include any local, remote or removable storage mechanism that can hold software applications, files, or data not being actively used. Such storage mechanisms typically includes one or more flash memory cells, but can be any secondary or tertiary storage device, such as magnetic media, EPROM, EEPROM, optical media, tape, or soft or hard disk.

In one embodiment, memory 204 may host a downloaded buyer client application module 206 specific to the service/product 120. Although not the product itself, the buyer client application module 206 may provide the mobile buyer with offer details 212 and may include a product preview 208 not directly available from the seller's catalog 114. In many cases, the information available from the catalog server 112 is text based and limited in scope.

FIG. 5 illustrates the elements of the offer details 212 downloaded as part of the buyer client application module 206, and may include a product/service identification ("ID") 502, offer expiration information 504, cost schedule 506, ordering information 508, and requirements for contract fulfillment 510. The cost schedule 506 may include multiple or different prices reflecting, for example, incentives, such as for early payment, multiple purchases, repeat customers, and preferred payment methods. The ordering information 508 may include: delivery information including time and destination; a content link indicating a source, such as a website, an internet protocol ("IP") address, etc., of the community purchasing server 104; and a website where further information may be available. The offer details 212 may also include requirements for contract fulfillment 510 comprising a total payment amount and how many individual micro transactions must be accumulated in order for the seller to deliver the product/service 120.

In one embodiment, the buyer client application module 206 may be operable to generate and transmit messages, including a micro transaction message 214. As shown in FIG. 6, the micro transaction message 214 may include the product/service ID 502, buyer information 232, and a micro payment amount 602 that may be based upon cost schedule 506. Buyer information 232 may be obtained from input mechanism 226, as well as information already stored in memory 204. Such buyer information 232 may identify the mobile buyer's wireless communication device 102 and may include an Internet Protocol ("IP") address, mobile identification number ("MIN"), phone number, name, or any other identifier associated with the mobile buyer or the mobile buyer's wireless communication device 102. Buyer information may also include credit card information, debit card information, checking or savings account information, and other funding source information necessary to purchase the product/service 120.

The buyer client application module 206 may be downloaded across network 122 to memory 204 of the computer platform 202. The buyer client application module 206 is executable by processing engine 222 to perform the buyer client operations of the community purchasing method as described herein. The buyer client application module 206 may interact with a media player module 230 to organize and execute product preview 208. Media player module 230 may be embodied in at least one of hardware, software, firmware, data and executable instructions, and generally controls interaction with any stored and/or received content, such as downloaded product 120.

Further, the buyer client application module 206 may further include purchasing logic 210 operable to guide the user through the purchasing process should the mobile buyer decide to purchase the product/service 120.

In one exemplary embodiment, an authorization code 218 may be transmitted to the buyer's wireless communication device 102 operable to permit the buyer to take delivery of the product/service 120.

In addition, buyer client application module 206 may include Graphic User Interface (GUI) logic 236 that may provide the coordination between the input mechanism 226 and output mechanism 228. The GUI logic 209, for example, may control, via output mechanism 228, any product preview 208 and offer details 212 downloaded as part of the buyer client application software 206. Further, the GUI logic 209 may work in coordination with the purchasing logic 210 to allow a user to order the product/service 120.

Processing engine 222 may be an application-specific integrated circuit ("ASIC"), or other chipset, processor, logic circuit, or other data processing device. Processing engine 222 may include various processing subsystems 236 embodied in hardware, firmware, software, and combinations thereof, that enable the functionality of the buyer's wireless communications device 102, and the operability of the device 102 on network 122, such as for connecting with the network 122, and for exchanging data/communications with other network devices. In one embodiment, processing engine 222 may include one or a combination of processing subsystems 236, such as: sound, non-volatile memory, file system, transmit, receive, searcher, physical layer, link layer, call processing layer, main control, remote procedure, music, audio, handset, power management, diagnostic, digital signal processor, vocoder, messaging, call manager, Bluetooth® System, Bluetooth® LPOS, position determination, position engine, user interface, sleep, data services, security, authentication, USIM/SIM, voice services, graphics, USB, video services, camera/camcorder interface and associated display drivers, multimedia such as MPEG, GPRS, etc., along with other functionality applications.

API 220 is a runtime environment executing on wireless communications device 102. One such runtime environment is Binary Runtime Environment for Wireless® (BREW®) software developed by Qualcomm, Inc., of San Diego, Calif. Other runtime environments may be utilized that, for example, operate to control the execution of applications on computing devices. API 220 allows software developers to create software applications that operate and controls certain functionality on the device 102.

In one embodiment, API 220 may include a class of software extensions that allow buyer client application module 206 to access the processing engine 222. Such software extensions may communicate with processing subsystems 236 that allow both data reads and commands and may send commands on behalf of the applications that invoke the extension. The API can then forward the responses of the subsystems to the invoking application. Each resident application on the device 102 can create an instance of this new software extension to communicate with the subsystems 236 independent of other applications.

Additionally, computer platform 202 may include a communications module 224 embodied in hardware, firmware, software, and combinations thereof, that enables communications among the various components of the wireless communications device 102, as well as between the device 102 and network 122. For example, the communications module 224 may control the transmission of micro transaction message 214 to the community purchasing server 104. Furthermore, any messages, such as purchase status messages and delivery verification messages from either the community purchasing server 104 or directly from the seller's communication device 116, 118 may be handled by the communications module 224.

The seller's communication device may be any type of computerized, wired or wireless device connected to network 122. For example, the seller's communication device may include a desktop computer 116 and a wireless device 118. Wireless devices 118 may include a "smart" cellular telephone, a personal digital assistant, a two-way text pager, a portable computer, and any computer platform that has a wireless communications portal to network 122.

The network 122 includes any communications network operable, at least in part, to enable communications between a mobile buyer communications device, such as wireless communication device 102, community purchasing server 104, seller's communication device 116, 118 and/or any other device connected to network 122. For example, network 122 may include at least one, or any combination, of: a cellular telephone network; a terrestrial telephone network; a satellite telephone network; an infrared network such as an Infrared Data Association ("IrDA")-based network; a short-range wireless network; a Bluetooth® technology network; a Zig-Bee® protocol network; an ultra wide band ("UWB") protocol network; a home radio frequency ("HomeRF") network; a shared wireless access protocol ("SWAP") network; a wideband network, such as a wireless Ethernet compatibility alliance ("WECA") network, a wireless fidelity alliance ("Wi-Fi Alliance") network, and a 802.11 network; a public switched telephone network ("PSTN"); a public heterogeneous communications network, such as the Internet; a private communications network; and a land mobile radio network.

Additional examples of telephone networks include at least one, or any combination, of analog and digital networks/technologies, such as: Personal Communications Services, code division multiple access ("CDMA"), wideband code division multiple access ("WCDMA"), universal mobile telecommunications system ("UMTS"), advanced mobile phone service ("AMPS"), time division multiple access ("TDMA"), frequency division multiple access ("FDMA"), orthogonal frequency division multiple access ("OFDMA"), global system for mobile communications ("GSM"), analog and digital satellite systems, and any other technologies/protocols that may be used in at least one of a wireless communications network and a data communications network.

Further, network 122 may include all network components, and all connected devices that form the network. For example, in an embodiment comprising a cellular telephone system, network 122 may include a local area network ("LAN") that connects and enables communication exchanges with catalog server 112. Additionally, the cellular telephone system embodiment includes a carrier network that controls messages (generally being data packets) sent to a mobile switching center ("MSC") Further, the carrier network communicates with the MSC through another network, such as the Internet, and/or POTS ("plain old telephone service"). Typically, this network has a first portion, such as the Internet, that transfers data and a second portion, such as the POTS, that transfers voice information. Additionally, the MSC may be connected to multiple base stations ("BTS") by yet another network, such as a data network and/or an Internet portion for data transfer and a POTS portion for voice information. The BTS ultimately broadcasts messages wirelessly to one or more wireless devices via an over-the-air method, such as short messaging service ("SMS").

Figure 3:
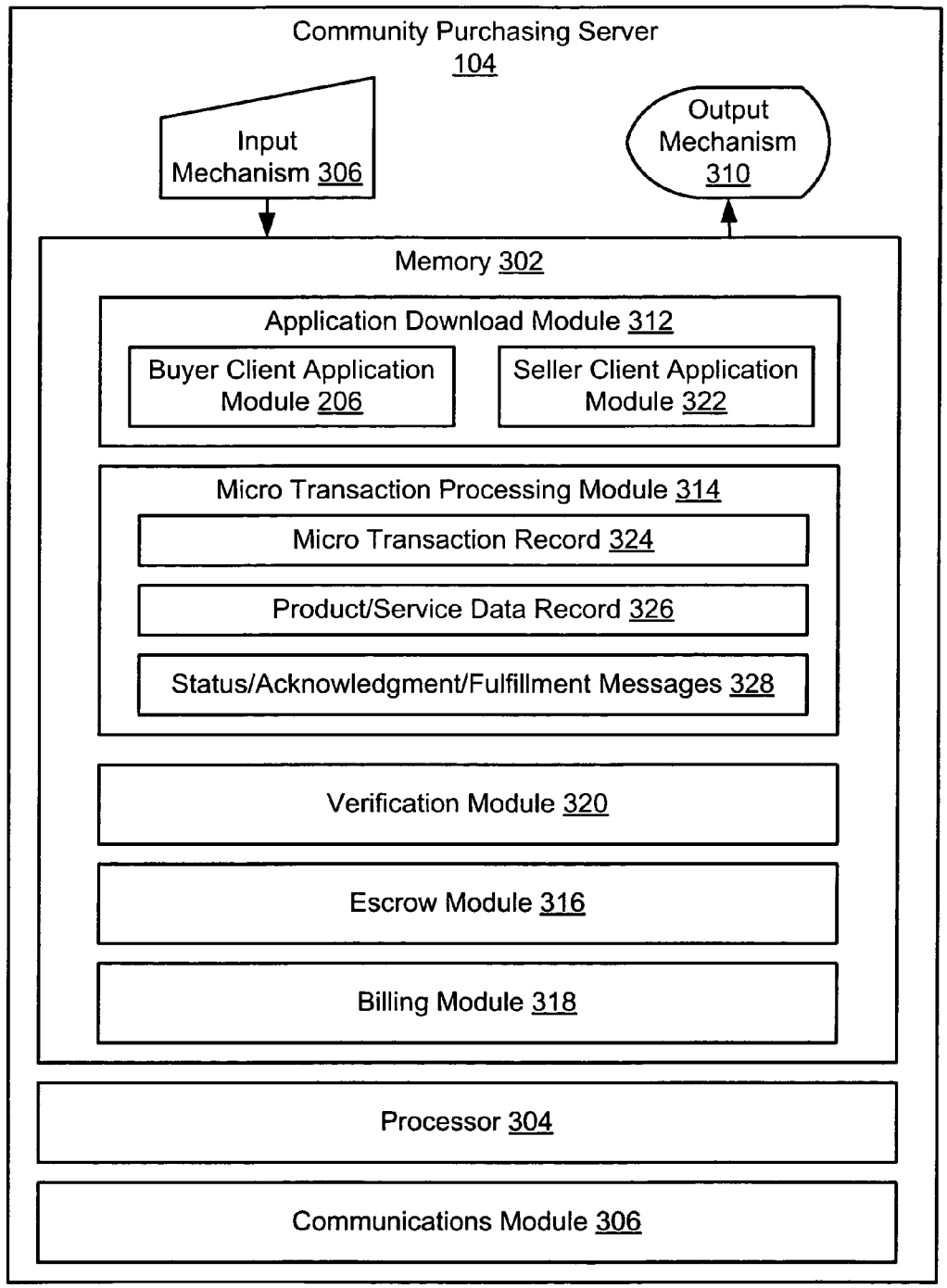
FIG. 3 is a schematic architectural diagram of one embodiment of a community purchasing server of the system of FIG. 1.

Referring to FIGS. 1 and 3, in one embodiment, community purchasing server 104, connected to network 122, may communicate with buyer's wireless communication device 102 and a seller's communication device 116, 118. The community purchasing server 104 may be operable to manage and control micro purchasing transactions between a community of mobile buyers and the seller. Community purchasing server 104 may be embodied in at least one of hardware, software, firmware, data and executable instructions, and may be any type of computerized device.

Community purchasing server 104 may include: a memory 302 for storing data and applications; a processor 304 for executing instructions; a communications module 306 for managing communications and data exchange within the various components of server 104 and network 122; an input mechanism 308 such as a keyboard and/or mouse for receiving user inputs; and an output mechanism 310 such as a display and/or a speaker for presenting output information to a user. In one embodiment, a user of server 104 may be a customer service representative, a technician, an operator, or some other person capable of monitoring, assisting and/or correcting the purchasing of product and services via micro transactions associated with the described embodiments.

Applications stored in memory 302 may include an application download module 312, a micro transaction processing module 314, an escrow module 316, a billing module 318, and a verification module 320. The application download module 312 may control the downloading of software modules to client devices, including the buyer client application module 206 and seller client application module 322. In one non-limiting embodiment, the download module 312, and the application modules 206, 322, contained therein, may reside on their own server, or in combination with other modules on other servers, not shown. Servers and internetworking components are not limited to the embodiments described herein.

The micro transaction processing module 314 is operable to receive a micro transaction message 214 from at least one mobile buyer, parse the message into appropriate fields, and store at least a portion of the micro transaction message 214 as a micro transaction record 324 in memory 302. The processing module 314 may be further operable to update a product/service data record 326 as each micro transaction message 214 is processed. Updating data record 326 may include accumulating the micro payment amount 602 from each micro transaction message 214 and generating at least one status message 328 regarding the sale of product/service 120. In one embodiment, status message 328 may be a contract fulfillment message generated upon achieving seller determined requirements for contract fulfillment 510. Such requirements 510 may include accumulating a seller determined total payment amount of received micro payments 602. Status messages 328 may be transmitted to their destination by the communications module 306.

The micro transaction processing module 314 may manage the community purchasing for multiple sellers and products/services. Accordingly, in one exemplary embodiment shown in FIG. 7, a data base 702 may contain at least one product/service data record 326, one product/service data record 326 for each product/service 120 being sold.

One embodiment of the community purchasing server 104 may comprise a verification module 322 operable to verify an identity of the buyer and their ability to purchase the product/service 120, and may include contact information necessary to verify the validity of buyer information parsed from micro transaction message 214. Such contact information may include banking institutions, credit institutions, and other sources of funding information.

A seller may not wish to take the risk that a micro payment 602 promised by a buyer is not available once the product/service is delivered or provided. Accordingly, in one exemplary embodiment, an escrow module 316 may be operable to remove the micro payment amount 602 from a buyer's bank account, credit card account, and other fund source, and store the micro payment 602 in an escrow account. Information, including micro payment amount 602, product/service ID 502, and portions of the buyer information 232 may be stored in the escrow module 316 and may permit the micro payment amount 602 to be returned to the funding source, for example, if a requirement for contract fulfillment 510 is not met, or, for example, if the product/service 120 is not delivered.

The billing module 318 may be operable to manage the release of escrowed funds as a result of a triggering event, for example, the delivery of the product/service 120 and meeting the total requirement for contract fulfillment 510.

Figure 4:
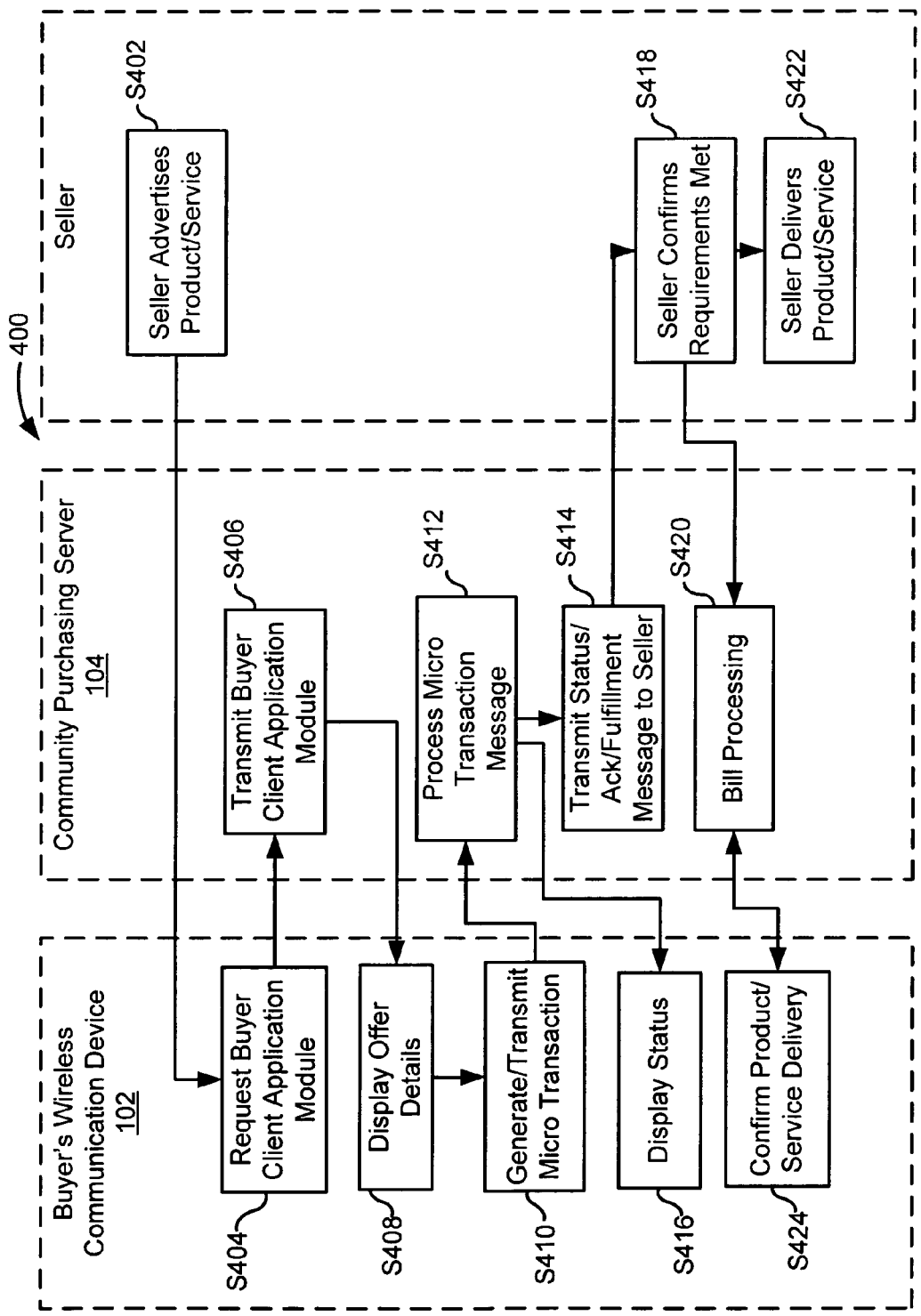
FIG. 4 is a flowchart of one embodiment of the message flow sequence between various components of the system of FIG. 1.

FIG. 4 is a flowchart describing an embodiment of a method 400 for implementing community based purchasing between mobile buyers and a seller based upon the system and components of FIGS. 1-3. A seller may, at step S402, advertise in different media, including advertising in an online catalog 114 hosted on network carrier's catalog server 112. Viewing a seller's catalog on a output mechanism 228 of wireless communication device 102 is fairly common. "Verizon Wireless"®, for example, offers a "Get it Now!"® feature that allows mobile users immediate download capability of digital content to their cellular telephones.

At step S404, a mobile buyer interested in the advertised product/service 120 may, under control of processing engine 222 and communications module 224, use input mechanism 226 to request delivery of buyer client application module 206, which in one embodiment, may be hosted on community purchasing server 104. The application download request message may include product/service ID 502 parsed from data from the seller's catalog 114, and information identifying the mobile buyer's wireless communication device 102. Such identifying information may include an Internet Protocol ("IP") address, mobile identification number ("MIN"), phone number, name, or any other identifier of the mobile buyer requesting receipt of the buyer client application module 206. This buyer information may have marketing value and may be made available to the seller, for example, upon request, periodically downloaded, or as a summary report.

At step S406, the community purchasing server 104 may, in response to the buyer's request at step S404, transmit buyer client application module 206 to the mobile buyer's wireless communication device 102. Once downloaded to memory 204, the buyer client application module 206, under control of API 220 and processing engine 222 may, at step S408, display the offer details 212 for the product/service 120 on output mechanism 228. Upon review of the specific details of the seller's offer, the buyer may, at step S410, initiate purchasing logic 210, operable to generate a micro transaction message 214. The buyer's wireless communication device 102 may transmit the micro transaction message 214 via communications module 224 to the community purchasing server 104, accepting the terms of the offer. In generating the micro transaction message 214, the purchasing logic 210 may require buyer information 232 to be entered via input mechanism 226.

The community purchasing server 104 may, via the communications module 306, receive a micro transaction message 214, and at step S412, initiate micro transaction processing module 314. Processing at step S412 may include parsing and processing parsed message 214 and transmitting status messages to the buyer's wireless communication device 102 where the messages may be displayed on output mechanism 228. In one exemplary embodiment, a micro transaction acknowledgment message may be transmitted to the buyer's wireless communication device 102 indicating receipt of micro transaction message 214. Further, processing may include determining whether the micro transaction 214 was received prior to expiration of the offer, based upon offer expiration information 504. If the offer had expired, the micro transaction processing module 314 may generate an offer expired message to be transmitted back to the mobile buyer's device 102.

If the micro transaction message 214 is timely, micro transaction processing may include validating the supplied micro transaction information 214 with a funding source, such as, a banking or credit institution, to verify that sufficient funds exist in the buyer's account to complete the micro transaction 214. Step S412 may further include the step of debiting the micro payment amount 602 from the buyer's source of funds and storing the funds in escrow.

Furthermore, upon validation of the micro transaction 214, step S412 may include updating product/service data record 326 for the specific product/service 120. Updating data record 326 may include accumulating and maintaining a total payment accumulated element 710, representing accumulated micro payment amounts 602, and a total micro transaction download element 712, indicating the number of micro transaction messages 214 received by the community purchasing server 104 for that product/service 120. The product/service data record 326 may further include the product/service ID 502, seller information such as seller identification ("ID") 704, offer expiration time 504, and at least one data element representing the seller's requirements for contract fulfillment 708.

Furthermore, in one exemplary embodiment, a data element 706, representing the number of buyer client applications requested and downloaded to interested mobile buyers, may be accumulated and stored for further analysis by the seller. Further, the community purchasing server 104 may, at step S412, generate and transmit a micro transaction received acknowledgment message to the buyer's device 102, whereupon at step S416, the acknowledgment message is displayed on the buyer's device 102 via output mechanism 228.

In one exemplary embodiment, the micro transaction processing module 314 may, at step S414, determine that the seller's requirements 708 have been met, whereupon a contract fulfillment message may be generated and transmitted to the seller. In one embodiment, the community purchasing server 104 may not wait for contract fulfillment before updating the seller/buyer with status information. For example, the micro transaction processing module 314 may download upon request, and/or periodically transmit, a status message 328 to the buyer and/or the seller containing portions of product/service data record 308.

As previously disclosed, the seller's communication device may be any type of computerized, wired or wireless device having a connection to a network 122. If the seller's device is a PC 116 wired to the network 122, the seller may communicate with the community purchasing server 102 via a web browser or other PC based application. If the seller's device is a wireless device such as a cellular telephone 118, the application download module 312 may comprise a seller client application 322 that may be downloaded onto the seller's wireless communication device 118. Similar to the buyer's wireless communication device 102, the seller's device 118 may include hardware and software modules operable to execute the seller client software 322.

Upon receipt of a contract fulfillment message generated at step S414, the seller may, at step S418, acknowledge the fulfillment message and transmit a contract completion acknowledgment message to community purchasing server 104. The seller may then, at step S422, initiate delivery of the product/service to the community of mobile buyers 102.

Upon receiving the contract completion acknowledgment message, bill processing may, at step S420, be initiated by billing module 318 and may include communicating with the escrow module 316 to release the micro payments 602 to the seller. In an alternate embodiment, the billing module 318 may, at step S424, request confirmation of product/service delivery, before releasing escrowed funds to the seller. Confirmation of delivery may include communicating with the buyer client wireless communication device 102 or may include communicating with a network carrier server, not shown.

Additionally, billing module 318 may generate and transmit an invoice/statement. For example, in an embodiment where the community purchasing method comprises a method for downloading digital content to a buyer or viewing a live act, billing module 318 may generate an invoice that may include a balance/payment due based on a purchase, or a series of purchases, by the mobile buyer. Such an invoice may be delivered electronically or by an alternate means of delivery.

Furthermore, the billing module 318 may incorporate mechanisms for handling refunds and return of product/services 120. Such mechanisms include automated and operator controlled systems for generating return authorizations and crediting funds back to the mobile buyer.

In addition, bill processing, at step S420, may include transmitting a purchase completion message to the buyer's wireless communication device 102 along with an authorization code 218. The authorization code 218 may allow the mobile buyer to download, or otherwise take possession of, the product/service 120. As disclosed above, the buyer's wireless communication device 102 may display various status messages and may display a message on the output mechanism 228 indicating that the community purchase has been successfully completed.

Depending upon the product/service 120, the authorization code 218 may be part of an authentication mechanism that may validate the identity of the buyer's wireless device 102, and may also validate the micro transaction. In one embodiment, product/service 120 may include content or data transferable to the wireless communication device 102 across network 122, the content including audio files, video files, software applications/programs, graphics, access to live, streaming data, etc., downloadable directly to the buyer's wireless device 102. Where the purchased product is downloadable digital data, the seller may verify the authorization code prior to releasing the digital content 120. The authentication mechanism may include, but is not limited to, a digital signature, an encryption algorithm, and a MAC.

In a further embodiment, the seller may, at any point prior to transmitting a contract completion acknowledgment message, transmit a cancellation request message to the community purchasing server 104. The community purchasing server 104 may, upon receipt of the cancellation request message, operate to return escrowed funds to the mobile buyer, and may further operate to generate and transmit a cancellation message to the buyer's wireless communication device 102.

Depending upon the specific product/service 120, product/service delivery, at step S422, may require a delivery method other than downloading product 120 to buyer wireless device 102. In one embodiment, the product/service may be a live act, or portions of a live act, which may be viewed in real time by the community of mobile buyers, provided the predetermined seller requirements are met. In the case of a live act viewed by the mobile buyers, it may be possible for mobile buyers, by using the methods described herein to vote for, or purchase, certain events or outcomes particular to the live performance. Alternatively, the product/service 120 may be a physical product requiring actual physical delivery.

It should be noted that the flowchart of the above-discussed steps is but one example out of a plurality of viable sequences. Other sequences may be utilized, for example, where messages are omitted, added, or have different destinations, such as in an embodiment where the separate modules of the community based purchasing server, are separated into several units.

While the various disclosed embodiments have been illustrated and described, it will be clear that the subject matter of this document is not limited to these embodiments only. For example, although buyer client application module 206 and media player module 230 have been described as independent mechanisms, they may be combined together or further separated in any fashion to perform the functions described above.

Additionally, the application download module 308, the micro transaction processing module 314, the billing module 318, and the seller's catalog 114 may be separated and hosted by different servers or combined in any fashion. Numerous other modifications, changes, variations, substitutions and equivalents will be apparent to those skilled in the art without departing from the spirit and scope of the disclosed embodiments as described in the claims.

Also, various presently unforeseen or unanticipated alternatives, modifications, variations or improvements therein may be subsequently made by those skilled in the art and are also intended to be encompassed by the following claims.

What is claimed is:

1. A method of purchasing a product or service from a seller by a community of buyers, comprising:
    receiving a micro transaction message from a buyer's wireless communication device, the micro transaction message including buyer information, a seller's product or service identifier, and a micro payment amount, the micro payment amount being a portion of a predetermined total amount required for delivery of the product or service to the community of buyers;
    processing the micro transaction message, wherein processing the micro transaction message includes accumulating the micro payment amount with at least one other buyer's micro payment amount to form the community's total accumulated payment amount;
    initiating a billing process based on a determination that the community's total accumulated payment amount meets or exceeds the predetermined total amount;
    delivering the product or service to the community of buyers, wherein the product or service is viewing a live performance; and
    receiving one or more votes and/or purchase instructions for certain events or outcomes particular to the live performance, from the community of buyers using their respective wireless communication devices.

2. The method of claim 1, further comprising:
    generating a fulfillment message indicting accumulation of at least the predetermined total amount; and
    transmitting the fulfillment message to a seller.

3. The method of claim 1, wherein initiating a billing process further comprises crediting a seller by the micro payment amount.

4. The method of claim 1, further comprising transmitting a buyer client application module to the buyer's wireless communication device, wherein the buyer client application module comprises purchasing logic and offer details, the offer details including the seller's product or service identifier and cost information.

5. The method of claim 4, wherein transmitting seller requirements includes transmitting the predetermined total amount.

6. The method of claim 4, wherein transmitting offer details includes transmitting an expiration time of an offer to purchase the product or service.

7. The method of claim 1, further comprising generating and transmitting a progress status message, the progress status message including at least one of a total of client application modules transmitted, and accumulated payment amount.

8. The method of claim 1, further comprising verifying delivery of the product or service.

9. The method of claim 1, further comprising validating a portion of the buyer information comprising the micro transaction message.

10. The method of claim 1, wherein the delivering step is triggered once the accumulated payment amount meets or exceeds the predetermined total amount.

11. The method of claim 1, further comprising transmitting a micro transaction received acknowledgment message to the buyer's wireless communication device.

12. The method of claim 1, wherein the product or service comprises digital content downloadable to the buyer's wireless communication device.

13. The method of claim 1, further comprising communicating with the seller via a wireless portal of a wireless network.

14. The method of claim 1, wherein processing the micro transaction message includes debiting a buyer's funding account by the micro payment amount and placing the micro payment amount in an escrow account.

15. The method of claim 14 further comprising releasing the escrowed micro payment amount upon receiving verification of delivery of the product or service.

16. The method of claim 1, further comprising transmitting an authorization code to the mobile buyer's wireless communication device, the authorization code providing access to the product or service.

17. The method of claim 1, further comprising receiving the micro transaction message from the buyer's wireless communication device over a mobile portal across a wireless network.

18. The method of claim 1, wherein the micro transaction message is received from a buyer client application module being executed on the buyer's wireless communications device with a mobile operating system.

19. The method of claim 1, further comprising:
executing a buyer client application module on the buyer's wireless communications device with a mobile operating system,
wherein the buyer client application module is configured to process the received product or service information and to generate the micro transaction message based on the processed product or service information.

20. A community purchase server configured to support purchasing of a product or service from a seller by a community of buyers, comprising:
means for receiving a micro transaction message from a buyer's wireless communication device, the micro transaction message comprising information regarding the purchase of a seller's product or service including a product or service identifier, and a micro payment amount, the micro payment amount being a portion of a predetermined total amount required for delivery of the product or service to the community of buyers;
means for processing the micro transaction message, wherein the processing of the micro transaction message includes accumulating the micro payment amount with at least one other buyer's micro payment amount to form the community's total accumulated payment amount;
means for initiating a billing process based on a determination that the community's total accumulated payment amount meets or exceeds the predetermined total amount;
means for delivering the product or service to the community of buyers, wherein the product or service is viewing a live performance; and
means for receiving one or more votes and/or purchase instructions for certain events or outcomes particular to the live performance, from the community of buyers using their respective wireless communication devices.

21. The method of claim 20 further comprising means for generating and transmitting a progress status message, the progress status message including at least one of a total of client application modules transmitted, and accumulated payment amount.

22. The method of claim 20, further comprising escrowing the micro payment amount in an escrow account.

23. A non-transitory computer-readable storage medium comprising at least one sequence of instructions related to purchasing from a seller by a community of buyers, wherein execution of the instructions by a processor causes the processor to perform the acts of:
receiving a micro transaction message from a buyer's wireless communication device, the micro transaction message including buyer information, a seller's product or service identifier, and a micro payment amount, the micro payment amount being a portion of a predetermined total amount required for delivery of the product or service to the community of buyers;
processing the micro transaction message, wherein processing the micro transaction message includes accumulating the micro payment amount with at least one other buyer's micro payment amount to form the community's total accumulated payment amount;
initiating a billing process based on a determination that the community's total accumulated payment amount meets or exceeds the predetermined total amount;
delivering the product or service to the community of buyers, wherein the product or service is viewing a live performance; and
receiving one or more votes and/or purchase instructions for certain events or outcomes particular to the live performance, from the community of buyers using their respective wireless communication devices.

24. A computer server for managing purchasing from a seller by a community of buyers, the computer server including a plurality of modules that are embedded in memory, comprising:
a communications module configured to receive a micro transaction message for purchasing a seller's product or service from a buyer's wireless communication device across a network, the micro transaction message comprising purchasing information, the purchasing information including a product or service identifier, and a micro payment amount, the micro payment amount being a portion of a predetermined total amount required for delivery of the product or service to the community of buyers;
a micro transaction processing module configured to accumulate the micro payment amount with at least one other buyer's micro payment amount to form the community's total accumulated payment amount;
a billing module configured to initiate a billing process based on a determination that the community's total accumulated payment amount meets or exceeds the predetermined total amount; and
a processor configured to execute the communications module, the micro transaction processing module and the billing module,
wherein the computer server is configured to deliver the product or service to the community of buyers,
wherein the product or service is viewing a live performance, and wherein the communications module is further configured to receive one or more votes and/or purchase instructions for certain events or outcomes particular to the live performance, from the community of buyers using their respective wireless communication devices.

25. The computer server of claim 24, wherein the micro transaction processing module is further configured to generate a fulfillment status message based upon the accumulated micro payment amount.

26. The computer server of claim 25, wherein the communications module is configured to transmit the fulfillment status message to at least one of the seller and buyer.

27. The computer server of claim 24 wherein the billing module is configured to debit the buyer and credit a seller upon receipt of the predetermined total amount.

28. The computer server of claim 24, wherein the micro transaction processing module is configured to verify the validity of a portion of the micro transaction message.

29. The computer server of claim 24, wherein the micro transaction processing module is configured to escrow the micro payment amount.

30. The computer server of claim 29, wherein the billing module is configured to release the escrowed micro payment amount to the seller.

31. A method of purchasing a product or service by a buyer among a community of buyers, comprising:
receiving product or service information on a buyer's wireless communication device from a source over a mobile portal across a wireless network, the product or service information comprising an identification of a seller's product or service;
transmitting a micro transaction message from the buyer's wireless communication device to a destination, the micro transaction message including buyer information and a micro payment amount, the micro payment amount being a portion of a predetermined total amount required for delivery of the product or service to the community of buyers;
receiving delivery of the product or service after an accumulated total of micro payments from two or more of the community of buyers meets or exceeds the predetermined total amount, wherein the product or service is viewing a live performance; and
voting for or purchasing certain events or outcomes particular to the live performance by the community of buyers using their respective wireless communication devices.

32. The method of claim 31, wherein receiving product or service information further comprises receiving a buyer client application module across the wireless network.

33. The method of claim 31 further comprising receiving a micro transaction acknowledgment message on the buyer's wireless communication device.

34. The method of claim 31, further comprising receiving a purchase completion message on the buyer's wireless communication device.

35. The method of claim 31, further comprising receiving the product or service after the total predetermined amount is achieved.

36. The method of claim 35, further comprising receiving the product or service as digital content on the buyer's wireless communication device via the wireless network.

37. A mobile buyer wireless communications device, comprising:
means for receiving product or service information on a buyer's wireless communication device from a source over a mobile portal across a wireless network, the product or service information comprising an identification of a seller's product or service;
means for transmitting a micro transaction message from the buyer's wireless communication device to a destination, the micro transaction message including a micro payment amount, the micro payment amount being a portion of a predetermined total amount required for delivery of the product or service to the community of buyers;
means for receiving delivery of the product or service after an accumulated total of micro payments from two or more of the community of buyers meets or exceeds the predetermined total amount, wherein the product or service is viewing a live performance; and
means for voting for or purchasing certain events or outcomes particular to the live performance by the community of buyers using their respective wireless communication devices.

38. A mobile buyer wireless communications device according to claim 37, further comprising a means for receiving an authorization code configured to permit delivery of the product or service.

39. A wireless communications device, comprising:
a memory, wherein the memory includes a buyer client application module downloaded to the memory across a wireless network from a source, the buyer client application module including an identification of a seller's product or service; and
a processor coupled to the memory, the processor configured to control the execution of the buyer client application module, whereby the buyer client application module is configured to:
transmit a micro transaction message from the wireless communications device to a destination, the micro transaction message including a micro payment amount, the micro payment amount being a portion of a predetermined total amount required for delivery of the product or service to the community of buyers,
receive delivery of the product or service after an accumulated total of micro payments from two or more of the community of buyers meets or exceeds the predetermined total amount, wherein the product or service is viewing a live performance, and
transmit, from the wireless communications device during the live performance, one or more votes and/or purchase instructions for certain events or outcomes particular to the live performance.

40. The device of claim 39, wherein the buyer client application module is further configured to receive a contract fulfillment acknowledgment message.

41. The device of claim 39, wherein the wireless communications device further comprises a cellular telephone and wherein the wireless network comprises a cellular telephone network.

42. The device of claim 39 wherein the processor is configured to accept an authorization code from an external source.

43. A non-transitory computer-readable storage medium comprising at least one sequence of instructions related to purchasing a product or service by a buyer among a community of buyers, wherein execution of the instructions by a processor causes the processor to perform the acts of:
receiving product or service information on a buyer's wireless communication device from a source over a mobile portal across a wireless network, the product or service information comprising an identification of a seller's product or service;
transmitting a micro transaction message from the buyer's wireless communication device to a destination, the micro transaction message including buyer information and a micro payment amount, the micro payment amount being a portion of a predetermined total amount required for delivery of the product or service to the community of buyers;

receiving delivery of the product or service after an accumulated total of micro payments from two or more of the community of buyers meets or exceeds the predetermined total amount, wherein the product or service is viewing a live performance; and voting for or purchasing certain events or outcomes particular to the live performance by the community of buyers using their respective wireless communication devices.

* * * * *